Oct. 6, 1931.　　　C. G. HALL　　　1,825,951
WAITERLESS RESTAURANT
Filed Feb. 3, 1930　　　6 Sheets-Sheet 1

INVENTOR
Charles G. Hall
BY
ATTORNEY

Oct. 6, 1931. C. G. HALL 1,825,951
WAITERLESS RESTAURANT
Filed Feb. 3, 1930 6 Sheets-Sheet 2
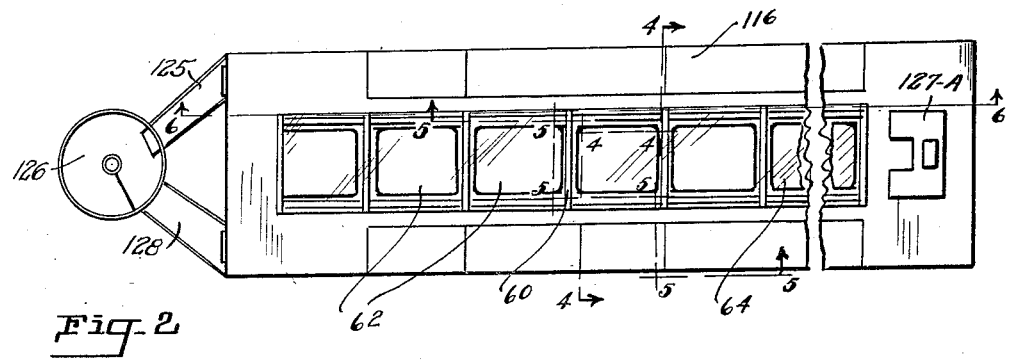
Fig. 2
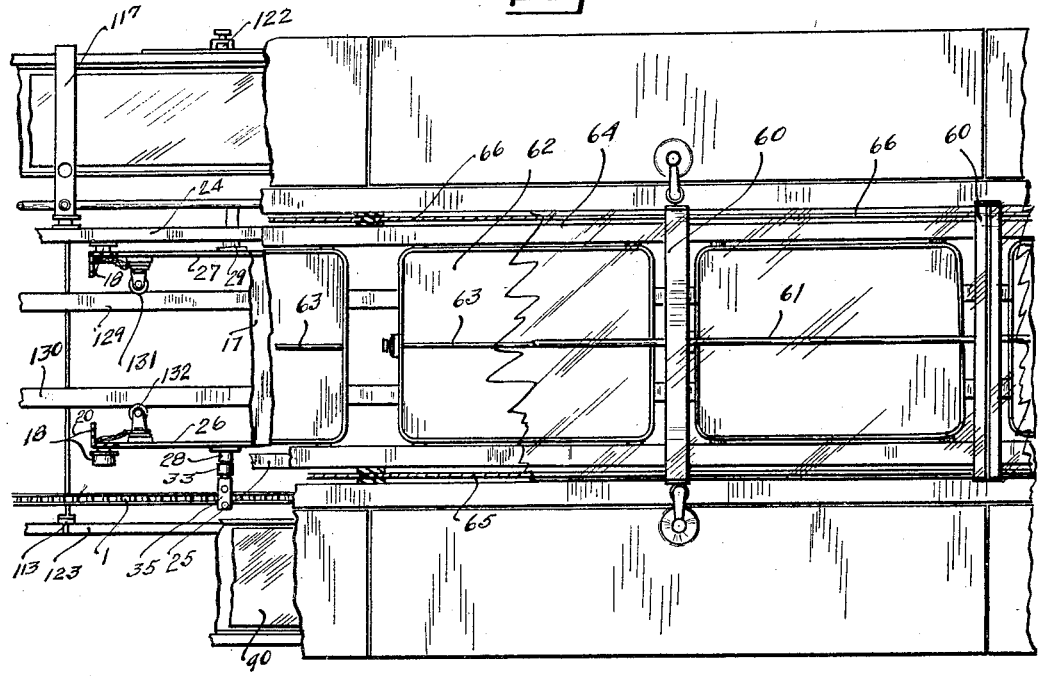
Fig. 3
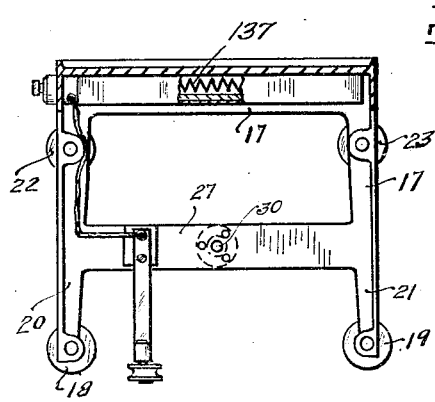
Fig. 12
Fig. 18
INVENTOR
Charles G. Hall
BY
Thomas Riley
ATTORNEY

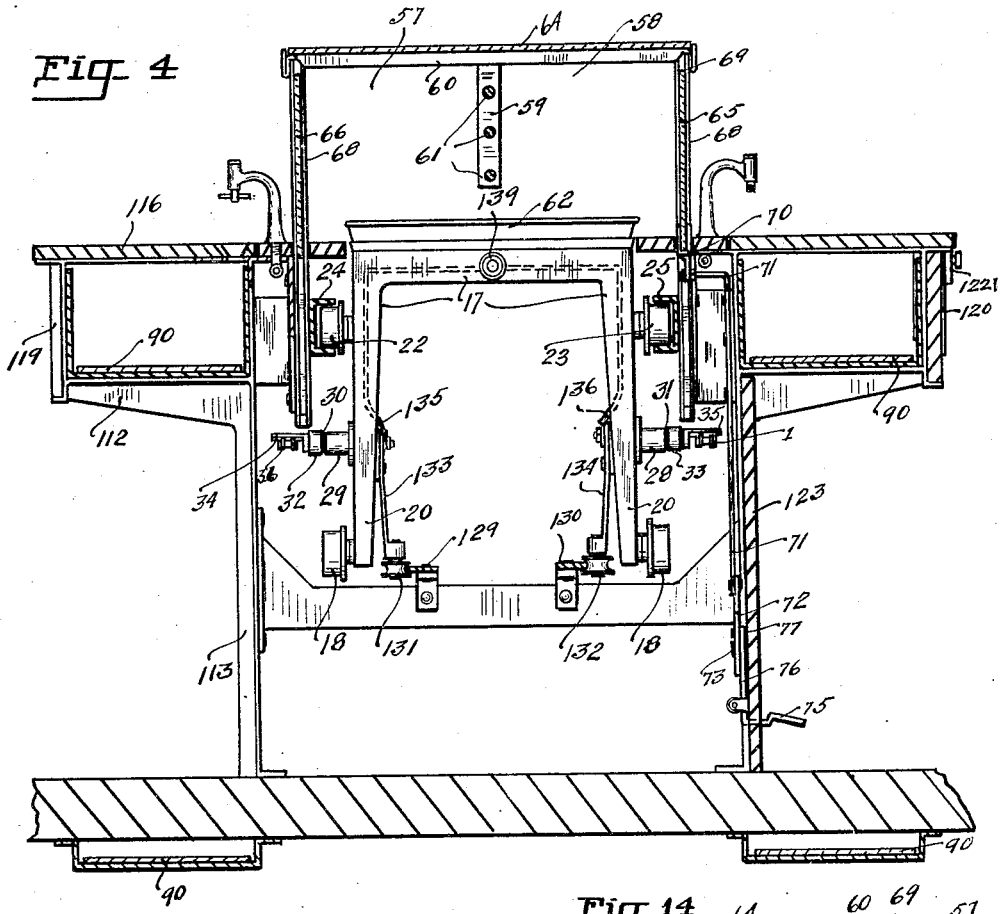

Oct. 6, 1931. C. G. HALL 1,825,951
WAITERLESS RESTAURANT
Filed Feb. 3, 1930 6 Sheets-Sheet 4

INVENTOR
Charles G. Hall
BY
ATTORNEY

Oct. 6, 1931.   C. G. HALL   1,825,951
WAITERLESS RESTAURANT
Filed Feb. 3, 1930   6 Sheets-Sheet 5
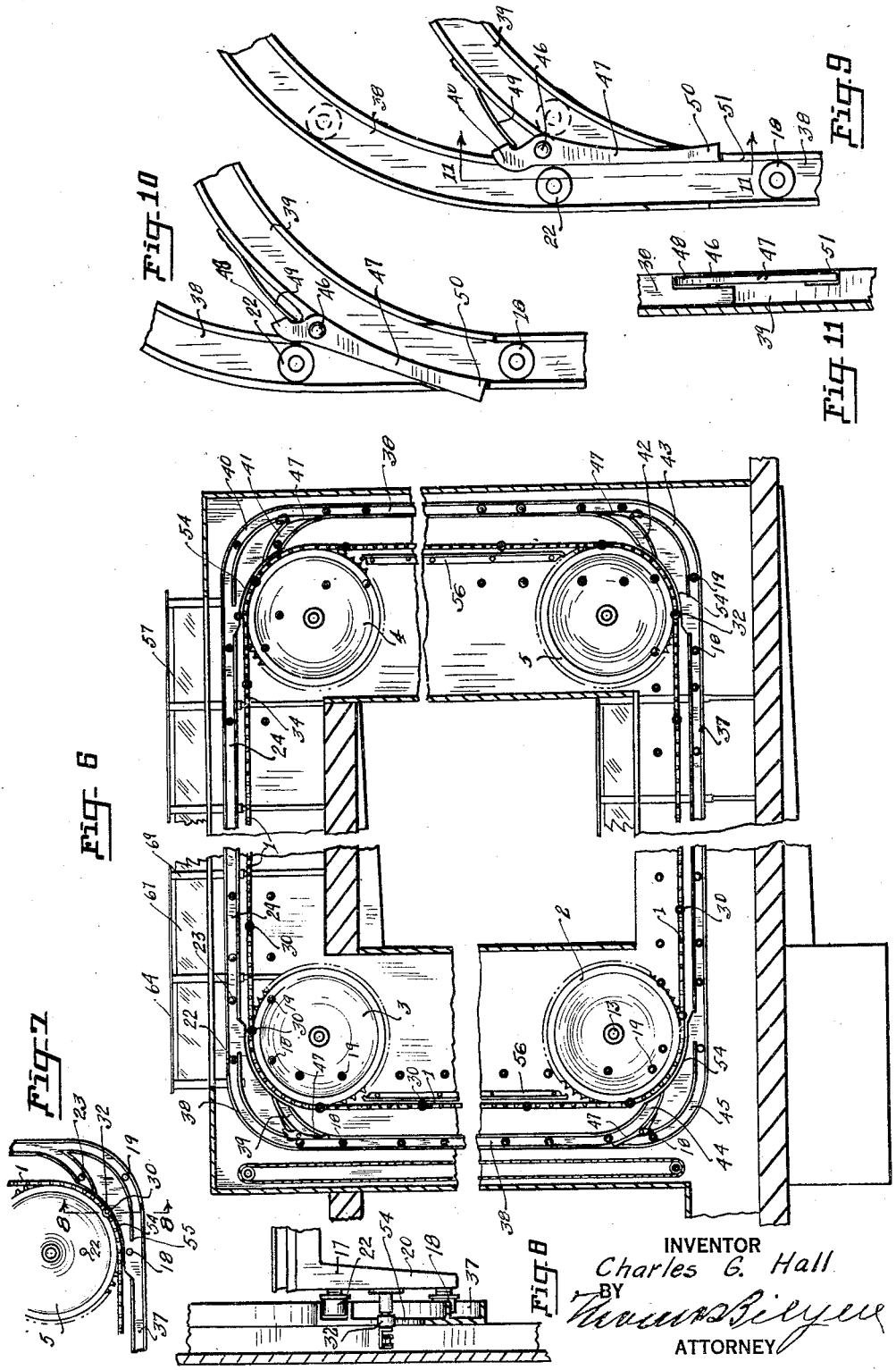
INVENTOR
Charles G. Hall
BY
ATTORNEY

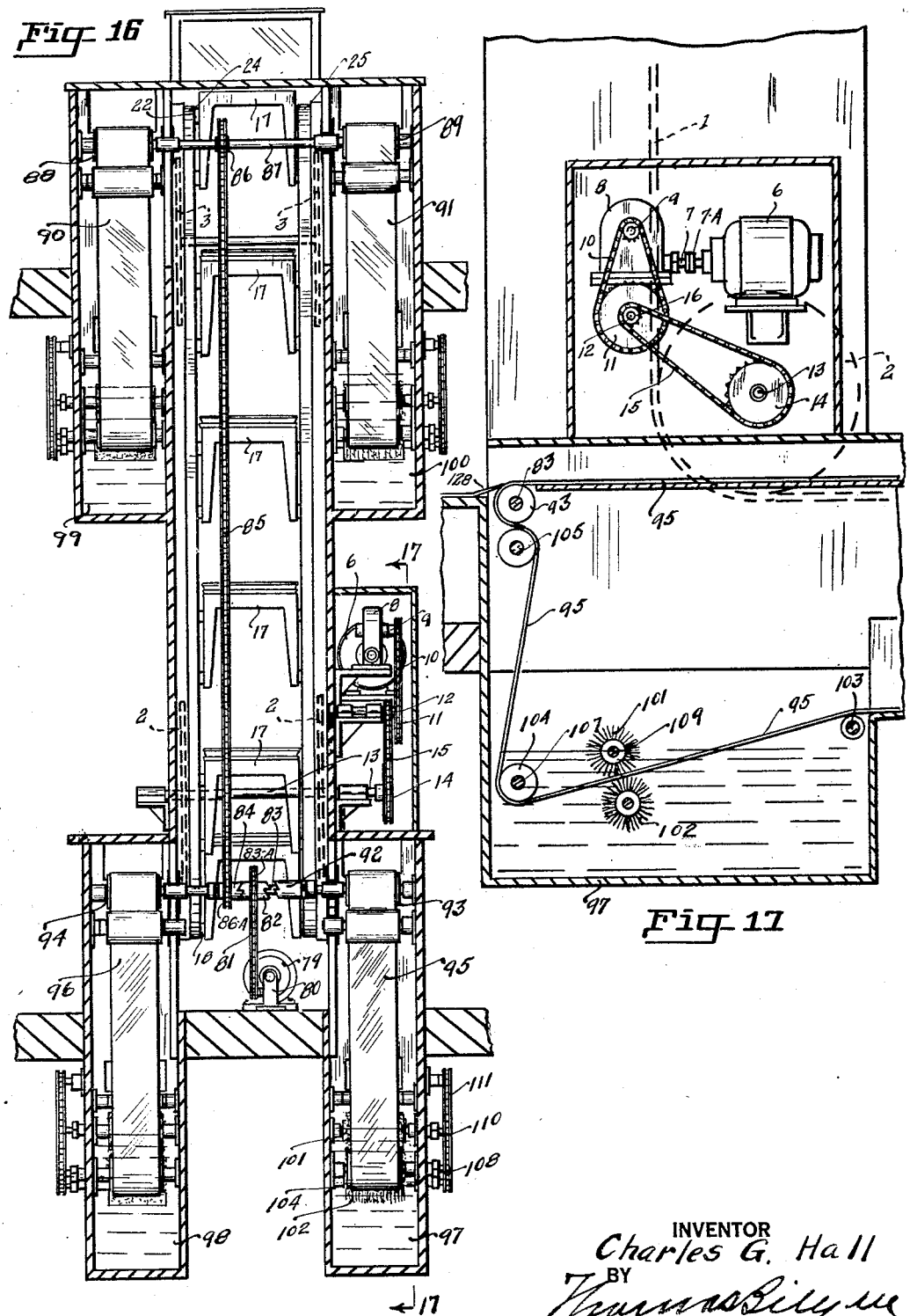

Patented Oct. 6, 1931

1,825,951

UNITED STATES PATENT OFFICE

CHARLES G. HALL, OF BOISE, IDAHO, ASSIGNOR TO AUTOMATIC FOOD MACHINERY CORPORATION, OF BOISE, IDAHO

WAITERLESS RESTAURANT

Application filed February 3, 1930. Serial No. 425,701.

My invention is intended for use as a conveyor for food and/or merchandise from a point of origin to the point of use, the same being adapted for being transferred upon an endless conveyor running longitudinally of the display space where the food and/or merchandise is to be displayed, sold and/or consumed.

The invention in its preferred embodiment consists of a primary endless conveyor running through a protected tunnel having transparent side and top walls. Secondary endless conveyors are disposed adjacent to and parallel with the primary conveyor, but preferably running in the opposite direction. Eating tables or display tables are provided over the secondary endless conveyor and serve as the top covering for the secondary endless conveyors. The covering for the endless conveyors have openings disposed therethrough to permit the placing of articles as soiled dishes, eating utensils and any and all substances thereupon to be transferred or carried back to the point of origin where the same may be reconditioned for use, or reuse. The endless conveyor system terminates in a distribution head from where the materials being transferred thereupon may be reconditioned for use. A cashier is stationed at the oppositely disposed end of the conveyor system past which the customers are obliged to pass in leaving the establishment.

The primary endless conveyor is adapted for the carrying of a plurality of spaced vehicles, each of which remains substantially in a horizontal position throughout its endless line of travel.

Means are provided, at one end of the device, for the placing of articles of food or merchandise thereupon and to be displaced as the same progresses through the display part of the building in which the same normally passes. The device in its preferred embodiment is adapted for the displaying of food and/or merchandise, upon more than one floor. Means are also provided for the maintaining of the secondary endless conveyors in a sanitary condition when being used.

The primary endless conveyor passes through a tunnel way having transparent top and side walls with means being provided for the admission of the hand of the patron through the side wall for the selection and removal of the desired article to be purchased or inspected. A partition runs longitudinally of the inspection tunnel so that the articles selected may be removed from one side only. This is primarily maintained for preventing the sleeve, or other wearing apparel, of the patron from engaging in, or upon, the articles to be displayed by reaching over the article nearest at hand. The partition prevents this and maintains all of the food in a highly sanitary condition during the displaying of the same. Means are provided for the maintaining of the tunnelway in a hot or cold condition or a part of the same in a hot or cold condition during the manipulation of the primary conveyor.

The primary object of my invention is to provide a device that may be used in the relatively high rent districts, and in the more highly conjested areas of all cities so that the merchants or eating house proprietors may have a minimum amount of front footage and yet accommodate a relatively large number of people in the store, or restaurant during the rush hour.

A still further object of my invention consists in providing facilities for the handling of a relatively large amount of food, or merchandise, with a minimum amount of help.

A still further object of my invention consists in providing a device that may be made to dispense food or merchandise from the point of origin of the same, and display the same to the patron, in mobile form, and to permit the patron to serve himself as the articles being displayed are passed immediately in front of him.

A still further object of my invention consists in providing a device, through the use of which, the patron may give an order at one location and the articles ordered will be permitted to pass directly in front of the patron with a minimum of delay.

A still further object of my invention consists in providing means to display, in mobile form, the article to be vended and to permit the patron to serve himself therefrom and to return to the starting point the soiled dishes, linen, eating utensils and other articles for reconditioning and reuse.

A still further object of my invention consists in providing means for the sanitary displaying of food and merchandise by the passing of the same in front of the patrons who may be seated in the line of travel of the articles to be vended.

Still further objects of my invention consist in providing means for the displaying of food and merchandise in the desired degree of heat, or cold, that may be predetermined that is most advantageous for the articles to be vended, to maintain the same in the highest savory condition during the vending process.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 2 is a fragmentary, top plan view of the mechanism illustrated in Fig. 1.

Fig. 3 is a longitudinal, sectional, top, plan view of the device, the same being made primarily to illustrate the series of trays disposed upon vehicles and in spaced relationship with each other that forms the primary endless conveyor.

Fig. 4 is a sectional, end view of one side of the primary and secondary endless conveyors, the same being taken on line 4—4 of Fig. 2 looking in the direction indicated.

Figure 5:
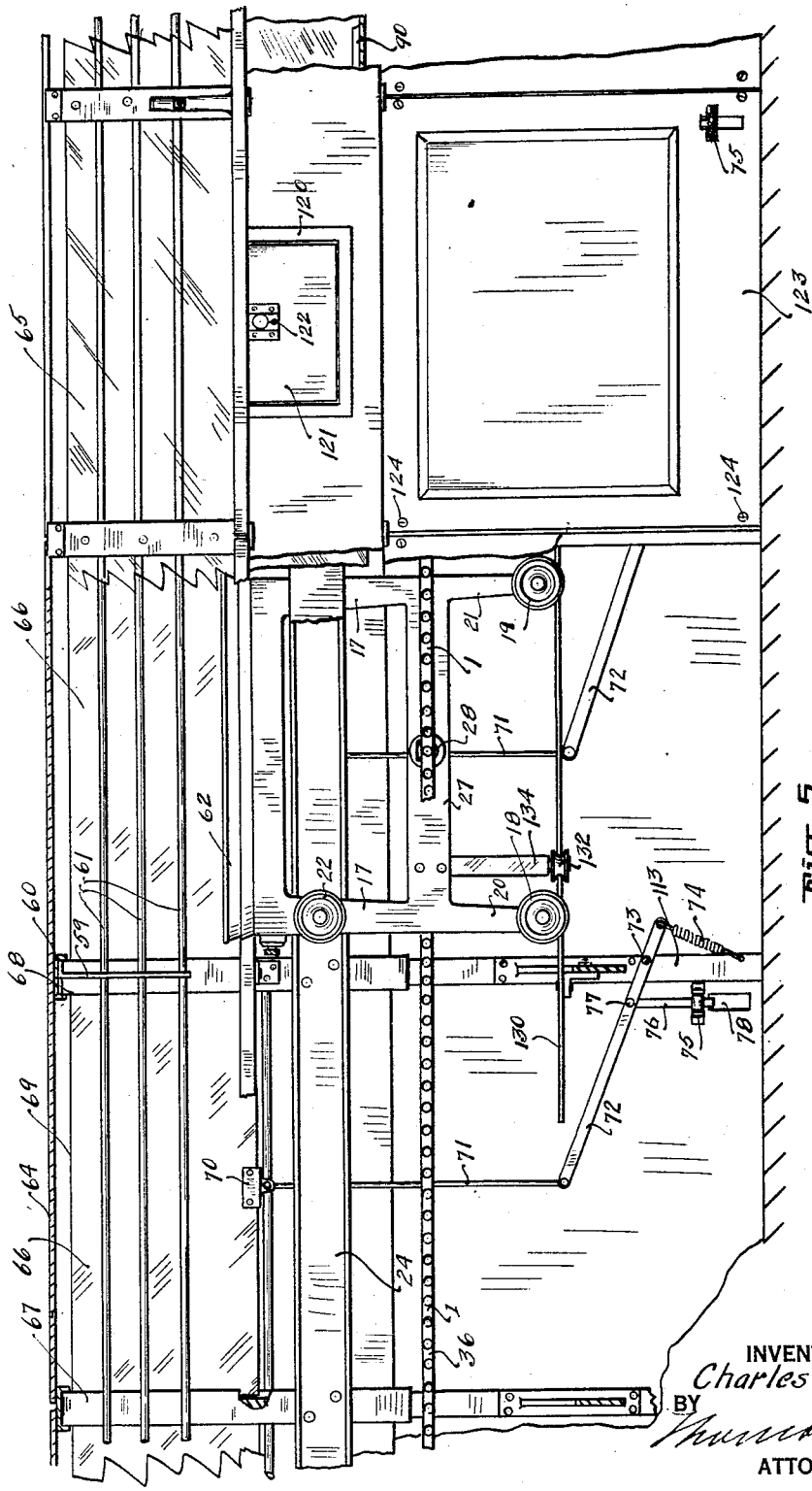

Fig. 5 is a fragmentary, longitudinal, sectional, side view of the mechanism illustrated in Fig. 2, the same being taken on line 5—5 of Fig. 2 looking in the direction indicated. In this view is shown one of the vehicles upon which the tray is mounted and illustrates the sectional view of the door forming the underside of the wall of the display counter and illustrates the mechanism for returning to normal position one of the transparent side partitions, forming the side wall of the tunnel, through which the articles of merchandise are to be displayed.

Fig. 6 is a fragmentary, sectional, side view of the endless conveyor systems illustrating the relatively large sprockets about which the endless conveyor chains are trained, and illustrating the mechanism for maintaining the vehicle carriages in substantially horizontal position as the same pass about the sprocket mechanism.

Fig. 7 is a fragmentary, sectional, side view of the frog mechanism disposed in the line of travel of the vehicles which is primarily intended for maintaining the carriage in horizontal position as the same passes about the sprocket wheels.

Fig. 8 is a sectional, end view of the mechanism illustrated in Fig. 7, the same being taken on line 8—8 of Fig. 7, looking in the direction indicated.

Fig. 9 is a fragmentary, sectional, side view of the frog and cross over mechanism and illustrating the locking latch disposed in the line of travel of the carriage structure and illustrating the latch normally closed.

Fig. 10 is a fragmentary, sectional, side view of the frog and cross over mechanism illustrated in Fig. 9 but illustrating the locking latch as being normally open. A reacting element is disposed in registerable alignment with the locking latch for normally returning the same to normal position of being closed when not being actuated by the trunnion wheels engaging the same.

Fig. 11 is a fragmentary, sectional, end view of the mechanism illustrated in Fig. 9, the same being taken on line 11—11 of Fig. 9 looking in the direction indicated.

Fig. 12 is a sectional, side view of one of the carriage vehicles shown removed from the endless conveyor mechanism for transferring the same throughout the cycle of operation.

Fig. 13 is a perspective, end view of one of the frames upon which the display counter rests and through the opening in which the secondary endless conveyor passes. The leg element forming the leg support for the assembled structure.

Fig. 14 is a fragmentary, sectional, side view of one of the transparent side walls forming the tunnel through which the articles to be merchandised are passed in endless formation with the central door being normally lowered to facilitate the selecting of the article to be purchased from the endless conveyor passing therethrough.

Fig. 15 is a fragmentary, sectional, end view of the display counter, the entrance door disposed in the side thereof to facilitate the placing of articles as dishes, soiled utensils, etc. back to the reconditioning head disposed at the end of the conveyor system. This also illustrates the secondary endless conveyor belt being disposed therein.

Figure 1:
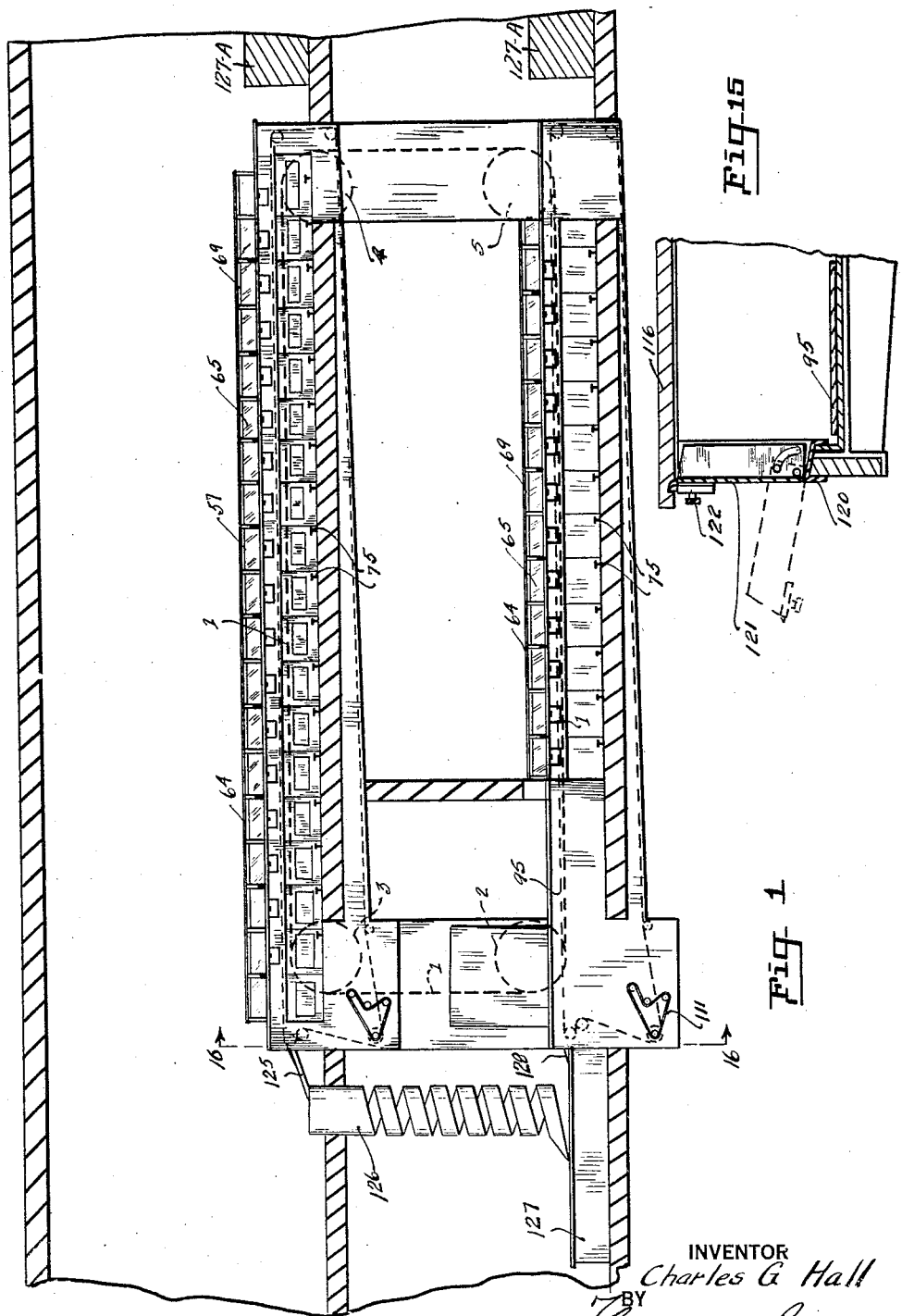
Fig. 1 is a side elevation, partially in section, of one of my new and improved vending devices in use for the restaurant trade.

Fig. 16 is a cross sectional, end view of the conveyor belt system, the same being taken on line 16—16 of Fig. 1, looking in the direction indicated. This view is primarily intended to illustrate the driving mechanism and the associated elements for driving the endless conveyors, both the primary and the secondary endless conveyor.

Fig. 17 is a fragmentary, sectional, side view of the driving prime mover, the same being taken on line 17—17 of Fig. 16 looking in the direction indicated. In this view is also shown the means for maintaining the secondary endless conveyor in sanitary condition and illustrating the washing vat through which the same are made to pass and the scrubbing brushes for cleaning the conveyor belt.

Fig. 18 is a sectional, side view of the supporting hub, the spindle rotatably disposed therein, and the roller disposed upon the spindle and the same is a cross sectional end view of the chain and the angle bar secured thereto that forms the hitching connection between the carriage and the chain that drives the same throughout its cycle of operation.

Like reference characters refer to like parts throughout the several views.

My device is intended for the conveying of food and merchandise longitudinally of a relatively narrow building wherein a primary endless conveyor chain 1 runs longitudinally of the building and its trained about suitable supporting sprockets 2, 3, 4, and 5. Each pair of supporting sprockets may be disposed at relatively long distances apart and each of the pairs of sprockets at each end are spaced apart sufficiently to permit the training thereabout of the chain and the supporting elements secured thereto. Movement may be imparted to the chain by any suitable driving means. Referring to Fig. 17, I accomplish this result by a prime mover as an electric motor 6. The armature shaft of the prime mover is connected by a flexible connection 7A to a shaft 7 that is the primary shaft of a speed reducer 8. The output shaft 9 of the speed reducer has a sprocket disposed thereupon about which a driving element, as a driving chain 10 is trained. The drive chain 10 is also trained about a sprocket 11 that is disposed upon a shaft 12. The prime mover is a relatively high speed device and the endless conveyor is adapted for being moved at a relatively low speed. One or more sprockets are formed in each group and the sprocket 2 is secured to the driven shaft 13. A sprocket 14 is disposed upon the shaft 13 and a driving element, as a chain 15, is trained about the sprockets 14 and 16.

The primary endless conveyor is made up of a plurality of vehicle carriages, one of which is shown in a sectional view in Fig. 12. The carriage is made up primarily of a fabricated frame 17 having pairs of trunnions 18 and 19 disposed at and terminating the end of the pairs of supporting legs 20 and 21 and pairs of trunnion wheels 22 and 23. The pairs of trunnion wheels 22 and 23 as illustrated in Fig. 4 are adapted for being carried through channeled guideways 24 and 25, disposed at either side of the channelway. Each of the carriage frames has side bars 26 and 27 as illustrated in Fig. 3 and supporting hubs 28 and 29 as illustrated in Fig. 4 are secured thereto. Spindles 30 and 31 are rotatably disposed within the hubs 28 and 29 and rollers 32 and 33 are disposed upon each of the spindles. The center of the hubs 28 and 29 and the spindles 30 and 31 are disposed equidistant from the axis about which the trunnion wheels 22, 23, 18 and 19 pass. This is primarily important in my assembly in order that the carriage may be maintained in a horizontal position in being transferred from horizontal position to vertical travel in either direction. Angle bars 34 and 35 are secured upon their one leg to the endless driving chains 36 and 1 and upon their oppositely disposed legs to the head of the spindles 30 and 31. In the horizontal movement of the carriage the trunnion wheels 22 and 23 move within the horizontally disposed channel ways 24 and 25 when the carriages are on the lower portion of the endless line of travel and during this time the trunnion wheels 18 and 18 perform no function whatsoever. When the carriages are on the upper portion of the endless line of travel, the trunnion wheels 18 and 19 become the supporting wheels by riding within the channel guide way 37 as illustrated in Fig. 6.

While the primary conveyor is being moved in a vertical position as illustrated in Fig. 6 one set of the trunnion wheels 23 and 19 ride within the channel guideway 38. This construction positively maintains the carriage in a state of equilibrium and prevents the tilting of the upper surface of the vehicle and maintains the vehicle in a horizontal position when being transferred from horizontal to vertical travel. The frogs, through which the trunnion wheels pass, in transferring the carriage from horizontal to vertical travel, or from vertical to horizontal travel, are illustrated in Figs. 6, 7, 8, 9, 10 and 11. The center of the hubs 28 and 29 and the spindles 30 and 31 are disposed equidistant from the axis about which the trunnion wheels 22, 23, 18 and 19 pass. This is primarily important in my assembly in order that the carriage may be maintained in a horizontal position in being transferred from horizontal to vertical travel in either direction. The radii of the center of the arc composing the channel way through which the respective trunnion wheels pass, as illustrated at 38 and 39, 40 and 41, 42 and 43, 44 and 45, are of equal length. Referring to Fig. 9 when the trunnion wheel 22 passes the stub shaft 46 on which the locking latch 47 is disposed the trunnion wheel engages the head 48 which is normally maintained in the channelway 38 and presses the head against the reacting element 49. In doing so, the free end 50 of the locking latch is moved into the channel way 51 and into the position as illustrated in full line position in Fig. 10. When this is accomplished the trunnion wheel 18 engages the inside of the free end 50 of the locking latch and directs the trunnion wheel into the channel guideway 39. In the meantime the trunnion wheel 22 continues to ride in the channel guideway 38. As soon as the trunnion wheel 22 has passed the head 48 of the locking latch the reacting spring 49 returns the locking latch 47 to normal position so that the next succeeding carriage will manipulate the locking latch in precisely the same manner as herein described.

The rollers 32 and 33 disposed upon the spindles 30 and 31 engage the circular surface 54 illustrated in Fig. 6 and maintain the endless chain in intimate engagement with the sprocket wheels about which the chains pass. This is primarily important because the endless chains in passing about the sprockets engage the sprockets only for one-fourth of the circumference of the respective sprockets.

Referring to Fig. 7, when the trunnion wheels 19 and 22 are disposed within the channel guideways 42 and 43 the trunnion wheel 18 is unsupported in its passage from the point 55 until the trunnion wheels 18 and 19 have been lowered to the full travel at which time the trunnion wheels 18 and 19 will be disposed in alignment with the respective channel guideways 37. During this period of travel about each of the sprockets, the curved surface 54 acts as a support for each of the vehicles as the rollers 32 and 33 engage upon the curved surface 43 so that the curved surface 54 serves the dual purpose of contacting the endless chains with the sprockets and for maintaining the vehicle carriages in a state of supported equilibrium in the path of the respective sprockets.

During the vertical travel of the respective vehicle carriages the trunnion wheels 23 and 19 are disposed within the channel way 38 as illustrated in Fig. 6 and the rollers 32 and 33 engage the vertically disposed bar 56.

The tunnel through which the respective carriages pass is partitioned longitudinally into two compartments 57 and 58. The partitioning is accomplished by a plurality of bars 59 that downwardly extend from the cross bars 60 as illustrated in Fig. 4 and spaced bars 61 form the partitions. The object of this partition is to prevent the patron eating at one side of the conveyor from reaching entirely across the food tray 62. The partition prevents the wearing apparel of the patron from engaging the articles of food disposed upon the food tray 62 by reaching thereacross. The respective trays 62 also have a longitudinal elevated rib 63 disposed therein that are in registerable alignment with the partitioning bars 61 so that articles of food may not be placed upon the tray in registerable alignment with the partition.

The tunnel through which the food is conveyed is comprised of transparent top closures as plate glass sections, each of which is independent of the other, to facilitate the removal of the transparent top closure for cleaning and for admission into the tunnelway. The side sections 65 and 66 of the tunnel way are movable up and down to permit the admission of the hand of the patron into the tunnel way to select and remove the articles of food desired. The transparent side wall members are movable vertically within suitable guide ways 67 and 68 with the top 69 of the transparent side wall members being in spaced relationship with the top section 64 to permit the placing of the hand of the patron upon the top of the same to repress the transparent wall member. A hinge 70 as illustrated in Fig. 5 is placed central of the transparent side wall member 66 and is secured thereto and a link 71 hingedly depends from the hinge 70. An operating lever 72 is hingedly secured to the link 71 and the operating lever 72 is hingedly disposed about a supporting pin 73 and a reacting element as a coil spring 74 normally maintains the side wall transparent member in an elevated position. The side wall transparent member may be repressed by the placing of the hand of the patron upon the top of the same or the same may be repressed by the placing of a foot lever 75 upon the lower end of the link 76 that is secured to the operating lever 72 by a supporting pin 77. This foot lever 75 outwardly extends through the side wall of the base of the assembled device and operates within the slot 78 so that the transparent side wall members may be manipulated either by hand or by foot power. The reacting elements normally return the transparent side wall member to closed position when not in use.

The prime mover 6 may be utilized in the driving of the secondary endless conveyors as well as the primary conveyor. However, there may be an independent prime mover for driving the secondary conveyor as illustrated in Fig. 16 at 79. The prime mover 79 has its speed reduced by driving through a speed reducer 80. The slow speed shaft of the speed reducer 80 has a sprocket disposed thereupon adapted for the driving of the driving chain 81. The driving chain 81 is trained about a sprocket 83A disposed upon the sleeve 82. The sleeve 82 is loosely mounted upon the shaft 83. Each end of the sleeve 82 has clutch engaging teeth disposed therein. A second sleeve 84 is also loosely mounted upon the shaft 83 and a sprocket 86A is disposed thereupon. The sleeve 84 is adapted for being moved longitudinally of the shaft 83 by any suitable shifting lever, not here shown. The chain 85 is trained about sprocket 86 that is fixedly positioned upon the driven shaft 87 and when the sleeve 84 is driven by its locking engagement with the sleeve 82 the shaft 87 is rotated. Driving pulleys 88 and 89 are disposed upon the shaft 87 and the rotating of the shaft 87 rotates the pulleys 88 and 89 and therefore drives the transfer belts 90 and 91 that are trained about the respective pulleys 88 and 89. I have shown in Figs. 1 and 16 the primary transfer conveyor as being run and operated on more than one floor of a building with facilities for feeding the patrons, or exhibiting merchandise, thereto to be sold upon more than one floor. The secondary conveyor belts are operated upon each floor of the building, and as separate units, each driven from the secondary prime mover 79. When it is found desirable for any purpose to drive the belts disposed upon the lower floor the clutch 92, disposed upon the shaft 83, is made to engage the clutch face of the sleeve 82 and the shaft 83 is then rotated. Since the clutch sleeve 92 is secured to the shaft 83 and is made to rotate therewith; when the clutch sleeve 92 engages with sleeve 82 the shaft 83 is then rotated. Driving pulleys 93 and 94 are fixedly secured to the shaft 83.

Secondary transfer belts 95 and 96 are trained about the driving pulleys 93 and 94 and the secondary transfer belts 95 and 96 are driven as the shaft 83 is driven. The secondary transfer belts are made to pass through tanks 97, 98, 99 and 100. Each tank has a sterilizing solution disposed therein through which the belts are made to pass. There is a tank for each of the transfer belts as illustrated in Fig. 17.

Scrubbing brushes 101 and 102 are rotated by power means, and are disposed at either side of and come into contact with the transfer belts in order to scrub the belt with the treating solution disposed within each of the respective tanks.

Referring to Fig. 17 the secondary transfer belt is trained about idler rollers 103, 104, 105 and 106 in order to cause the secondary transfer belt to move within a predetermined path. As the secondary transfer belt 95 passes about the roller 104, the shaft 107 is rotated. The shaft 107 has a sprocket 108 disposed thereupon and the shaft 109 to which the roller 101 is mounted also has a sprocket mounted thereupon and the shaft 110 to which the brush 102 is secured has a sprocket disposed thereupon and the driving chain 111 is trained about the respective sprockets so that each of the brushes are driven and are made to engage oppositely disposed sides of the transfer belt as the same passes through the cleansing and sterilizing solution. Each of the belts pass through treating solutions and each tank having the treating solution therein has cleansing brushes that are made to operate as herein described.

I have found that the construction of my device may be greatly simplified by the forming of a fabricated frame. One unit of the frame is illustrated in Fig. 13. A frame structure 112 is formed having a leg support 113. A foot 114 terminates the lower end of the leg and the leg and the frame may be fastened to the floor by any suitable fastening means passing through the foot and into the floor. The side frame members are secured to the vertically disposed side wall 115 and the display counter 116 is removably secured to the top bar 117. The secondary transfer belt passes through the opening 118 disposed centrally of the upper portion of the body of the frame structure. Side closures 119 are placeable within the channel way disposed above the end of the frame.

Where my device is being used for restaurant purposes the patron is seated adjacent either of the display counters and an opening 120 as illustrated in Fig. 5 is disposed within the side closures and a door 121 is hingedly secured to the closure 119 and when operated the patron, or other attendant, of the eating establishment may place articles through the door and upon the secondary transfer belt from where the same is transported to a central station head disposed at one end of the device. Where a la carte service is being rendered to the patron it may not be found desirable for the patron to deposit the dishes or food-containing receptacles upon the secondary transfer chain without checking the same. When this is desired a lock 122 is placed upon the door and which may only be opened by the attendant having a key for the same, in which event the patron is given a ticket for his meal by the inspection of the receptacles upon which the food was placed and in doing so the attendant will then deposit the dishes, eating devices, soiled linen, etc. through the door 121 and upon the transfer belt.

Panels 123 are placeable within, and upon, the spaced legs and frames 113 and are secured thereto by any suitable fastening means as by screws 124. This permits the removal of the panel for any desired purpose. A cross section of the door and the closure is illustrated in Fig. 15 and shows the construction of the door and the ease with which the same may be opened to facilitate the placing of the residue upon the secondary transfer belt. The secondary transfer belts operate in conjunction with a release shoe 125 as illustrated in Fig. 1 which scoops the articles from the secondary transfer belt and deposits the same into a common spiral 126 which distributes the articles to be reconditioned upon a reconditioning head 127. The secondary transfer belts disposed upon the lower floor distributes the articles upon the shoe 128 from where the articles are distributed and delivered upon the reconditioning head 127. Pay stations 127A are disposed at the oppositely disposed end of the conveyors on each of the floors through which the conveyors run.

It may be found desirable to electrically heat some of the articles and where this is found desirable the result may be accomplished by the mechanism illustrated in Figs. 3, 4 and 12. Trolley bars 129 and 130 run longitudinally of the assembled device and trolley wheels 131 and 132 depend from the carriage vehicle as from the trolley arms 133 and 134.

Electric energy is supplied to the trolley bars 129 and 130 from any suitable source of electric energy not here shown. The ends of the electric conductors 135 and 136 are secured to the trolley arms 133 and 134 and a resistance wire 137, as illustrated in Fig. 12, is disposed within the top of the vehicle and immediately below the tray. When it is desired to heat the upper surface of the vehicle upon which the food is to be placed the switch 139 is manipulated by hand to thereby pass the electric current through the resistance 137.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of primary and secondary conveyors driven by a common prime mover, one of the secondary conveyors being disposed at either side of the primary conveyor, the secondary conveyors being at a lower elevation than that of the primary conveyor and running in opposite directions to that of the primary conveyor, means for maintaining the conveyors under cover throughout their line of travel, means for permitting the placing and/or removal of materials from the primary conveyor, means for permitting the placing of materials upon the secondary conveyors, means for removing such materials from the secondary conveyors at the end of their line of travel, means for sterilizing the secondary conveyors, means for scrubbing the secondary conveyors, and a reconditioning head disposed at one end of all the conveyors.

2. In a device of the class described, the combination of primary and secondary conveyors driven by a common prime mover and in opposite directions and at different elevations, spaced trunnion supported vehicles comprising the primary endless conveyor, a tunnel formed of transparent top and side walls through which the primary endless conveyor passes, the side walls being composed of manually manipulative sections and a tunnel through which the secondary conveyors pass and entry doors through which articles may be passed for delivery upon the secondary conveyors.

3. In a device of the class described, the combination of a vehicle composed of a fabricated frame, four trunnion wheels composed of two pairs each disposed at oppositely disposed sides of the vehicle frame, side frames disposed at oppositely disposed sides of the fabricated frame, a hub disposed within the frame, the center of which is disposed equidistant from the center of rotation of each of the trunnion wheels disposed upon the respective sides of the vehicle, a spindle rotatably disposed within the hub, a roller disposed upon the spindle, means associated with the spindle for attaching the spindle to a transfer chain, and a tunnel formed of transparent top and side walls through which the vehicles travel.

4. In a device of the class described, the combination of a vehicle tunnel, transparent top and side walls comprising the tunnel, the side walls being composed of independent sections slidably disposed within vertically disposed guideways, means for normally maintaining the side sections in an elevated position and spaced bars partitioning the tunnel in two compartments running longitudinally of the tunnel.

5. In a device of the class described, the combination of a primary endless conveyor belt composed of independent vehicles spaced apart, secondary endless conveyor belts running in the opposite direction to the primary endless conveyor and at lower elevations, a common prime mover for the conveyor belts and means for reconditioning the secondary conveyor belts for maintaining the same in a sanitary condition consisting in a vat having a medicated fluid therein through which each of the secondary conveyor belts pass and a power driven abrasive brush engaging each side of the belt.

6. In a device of the class described, the combination of a primary endless conveyor having vehicles associated therewith, means for maintaining each of the vehicles in a horizontal position throughout its line of travel, a pay station disposed at one end of the conveyor, secondary endless belts disposed parallelly to, and at a lower elevation than that of the primary conveyor, and a reconditioning head disposed at one end of the conveyors and at the oppositely disposed end than that to which the pay station is disposed.

7. In a device of the class described, the combination of a fabricated vehicle frame, trunnion wheels rotatably disposed within the frame, horizontally disposed side rails connecting the legs of the vehicle, a hub secured to and outwardly extending from the rail and equidistant from the center of rotation of each of the trunions, a spindle rockably disposed within the hub and a roller disposed about the spindle and rotatable thereupon and an angle bar secured to the spindle and outwardly extending therefrom.

8. In a device of the class described, the combination of a vehicle frame, trunnion wheels rotatably disposed within the frame and a spindle maintaining a roller and an angle bar rotatably disposed within the side wall of the frame, an electric heat element mounted within the frame and means for conducting electricity from the exterior of the frame to the heat element.

9. In a device of the class described, the combination of a frame, transparent side walls adapted to having an up and down movement imparted thereto forming the side walls of the upper part of the frame, a hinge disposed centrally of each of the transparent side wall members, a link pivotally secured to the hinge, an operating lever secured to the link, a foot lever for manipulating the operating lever and a reacting element for normally maintaining the assembly in placement.

10. In a device of the class described, the combination of a transparent side wall member, a hinge fixedly positioned upon the lower side of and central of the transparent side wall member, guideways for predetermining the line of movement of the transparent side wall member, a reacting element for normally maintaining the transparent member in normal raised position and foot manipulative means for lowering the side wall member.

11. In a device of the class described, the combination of a frame, primary endless belts running longitudinally of the fabricated frame and secondary endless belts running longitudinally of the fabricated frame and at either side of the primary conveyor and parallelly thereto, display counters disposed over the secondary endless transfer belts and panels forming the side walls of the frame and removably secured to the frame.

12. In a device of the class described, the combination of a fabricated frame, a primary endless conveyor belt composed of chains and vehicles, spaced apart, secured thereto, running longitudinally of the fabricated frame, secondary parallelly disposed belts running longitudinally of the frame and parallelly to the primary endless conveyors spaced apart therefrom and running in the opposite direction, display counters supported upon the frame and disposed over the secondary endless conveyors, side closures disposed below the counter sections, openings disposed therethrough to permit the placing of articles upon the secondary endless conveyor and panels forming the side walls of the frame and removably secured thereto.

13. In a device of the class described, the combination of a plurality of endless conveyor belts, means for driving each of the belts independently of the other, sterilizing agencies disposed in the line of travel of the belts, means for permitting the removal of materials from one of the belts and means for permitting the placing of materials upon other of the belts, a pay station disposed in the line of travel and at the reverse in direction of the travel of the belts, and a sorting head disposed at the oppositely disposed end of the primary line of movement of each of the belts.

14. In a device of the class described, in combination, a primary endless conveyor, composed of independent vehicles disposed in spaced relationship to each other, means for driving said conveyor, a plurality of endless conveyor belts parallelly disposed on each side and running in the opposite direction to the primary conveyor, means for driving said belts, a tunnel disposed above the primary conveyor, display counters disposed above the endless belts, and means for reconditioning the endless belts continuously.

15. In a device of the class described, in combination, a primary endless conveyor, means for driving said conveyor, a plurality of endless conveyor belts disposed on each side of the primary conveyor, independent means for driving said belts, a tunnel disposed above the primary conveyor, said tunnel comprising a plurality of vertically movable side walls, display counters disposed above the endless belts, means for reconditioning the endless belts, panels disposed below the display counters, and a plurality of closures disposed therein for permitting the placing of articles upon the endless belts.

CHARLES G. HALL.